United States Patent [19]

Watkins

[11] 4,452,552

[45] Jun. 5, 1984

[54] DEPTH SENSING TRIGGER MECHANISM

[76] Inventor: John A. Watkins, 361 Country Club Rd., Cheshire, Conn. 06410

[21] Appl. No.: 378,863

[22] Filed: May 17, 1982

Related U.S. Application Data

[62] Division of Ser. No. 195,927, Oct. 10, 1980, Pat. No. 4,362,444.

[51] Int. Cl.$^3$ .............................................. B23B 39/00
[52] U.S. Cl. ....................................... 408/14; 408/17; 408/15
[58] Field of Search ....................... 408/14, 15, 17, 10, 408/11; 173/19

[56] References Cited

U.S. PATENT DOCUMENTS

| | | | |
|---|---|---|---|
| 1,513,846 | 11/1924 | Mirrielees | 408/14 X |
| 1,665,411 | 4/1928 | Galloway et al. | 408/14 X |
| 4,123,187 | 10/1978 | Turner | 408/17 |

Primary Examiner—William R. Briggs
Assistant Examiner—L. Meier
Attorney, Agent, or Firm—Louis Orenbuch

[57] ABSTRACT

A drilling machine of the woodpecker type employs a spindle carrying a drill. The spindle is mounted for rotation in a housing having an attached feed screw and those members form an assembly that can be axially moved while the spindle rotates to enable the drill to be fed toward and retracted away from the work. The feed screw is engaged by a nut whose position is controlled by a rapid traverse mechanism which can rapidly retract the spindle away from the work and can rapidly advance the spindle toward the work. The rapid traverse mechanism holds the nut fixed in position in the interval between rapid advance and rapid retraction. A peck feed machanism is connected to the feed screw and repititively feeds the spindle toward the work by causing the feed screw to progressively advance into the nut in the intervals when the nut is fixed in position. A hitch feed is coupled to the feed screw and acts to prevent the drill from bottoming in the hole on rapid advance. A trigger mechanism is arranged to be fired upon drilling of the hole to a predetermined depth. Upon firing, the trigger mechanism causes the feed screw to be disengaged from the hitch feed and from the peck feed mechanism whereby the feed screw is enabled to return to a starting position relative to the nut.

4 Claims, 20 Drawing Figures

DEPTH SENSING TRIGGER MECHANISM

This is a division of application Ser. No. 195,927, filed Oct. 10, 1980, now U.S. Pat. No. 4,362,444.

FIELD OF THE INVENTION

This invention relates in general to drilling machines for producing holes with a rotating cutting tool. More particularly, the invention pertains to drilling machines of the kind known as peck drills or woodpecker drills.

BACKGROUND OF THE INVENTION

The distinctive feature of "woodpecker" drilling machines is the repetitive withdrawal of the cutting tool from the hole to clear the chips produced in the drilling operation. All peck drilling machines repetitively perform the steps of feeding the drill into the work, retracting the drill to clear the chips formed by the cut material, and again feeding the drill into the hole made in the work to drill to a greater depth.

Drilling holes that are relatively deep is usually a problem when the depth of the hole is seven times or more greater than the diameter of the hole. The problems encountered when drilling beyond such depths are: (1) the hole tends to run out because of bending of the drill as it penetrates to greater depths, (2) drill life is shortened because more rapid dulling of the cutting edges occurs which increases the frequency of sharpening the drill, and (3) breaking of the drill. The problems are caused by the chips that pack in the flutes of the drill. When chip packing is eliminated, a properly sharpened drill can make a hole to very great depths without difficulty. It is well known that metal removal rates in drilling can be increased and dulling of the cutting tool can be reduced by using coolants during the drilling operation. The lubricity of coolants helps the chips move up the flutes of the drill and thereby counteracts to some extent the tendency of the chips to pack in the flutes. The only satisfactory and positive way to eliminate chip packing, however, is to intermittently withdraw the drill from the hole to cause the chips to be pulled out of the hole along with the drill.

In peck drilling, after the drill is withdrawn to clear the chips, the drill is usually rapidly advanced into the hole. As the drill approaches the bottom of the hole, the advance of the drill is changed to a slower speed suitable for recommencing drilling of the work. If the drill is allowed to strike the bottom of the hole on the rapid advance, the drill may break or be damaged. If the cutting tool does not break, then any damage to the drill is likely to make the hole run out by drilling crooked. Consequently, experience has shown that in peck drilling, the drill must not be allowed to hit the bottom of the hole in a rapid advance. Experience has also shown that when a hole is made completely through a work, the drill tends to break if it is allowed to jump forward as it breaks through the bottom of the hole. Consequently, at the breakout, it is provident to keep the feed rate at the same rate used in drilling into the work.

Air-hydraulic peck drills are well known and have been used for many years in drilling operations. Air-hydraulic peck drills, in comparison to the invention herein disclosed require comparatively long and tedious set-up procedures. Moreover, the conventional hydraulic machine may require readjustment as it warms up. Further, it is extremely difficult to consistently meter hydraulic fluid in the very small quantities required to control the drill feed when drilling small holes. The conventional hydraulic peck drilling machine employs a dashpot mechanism to control the rate at which the drill is fed into the work. Those hydraulic machines always let the feed rate speed up at breakout because the reduced resistance to the advance of the drill is not compensated by an offsetting reduction in the pressure on the dashpot which controls the feed rate.

GENERAL DESCRIPTION OF THE PREFERRED EMBODIMENT

Figure 1:
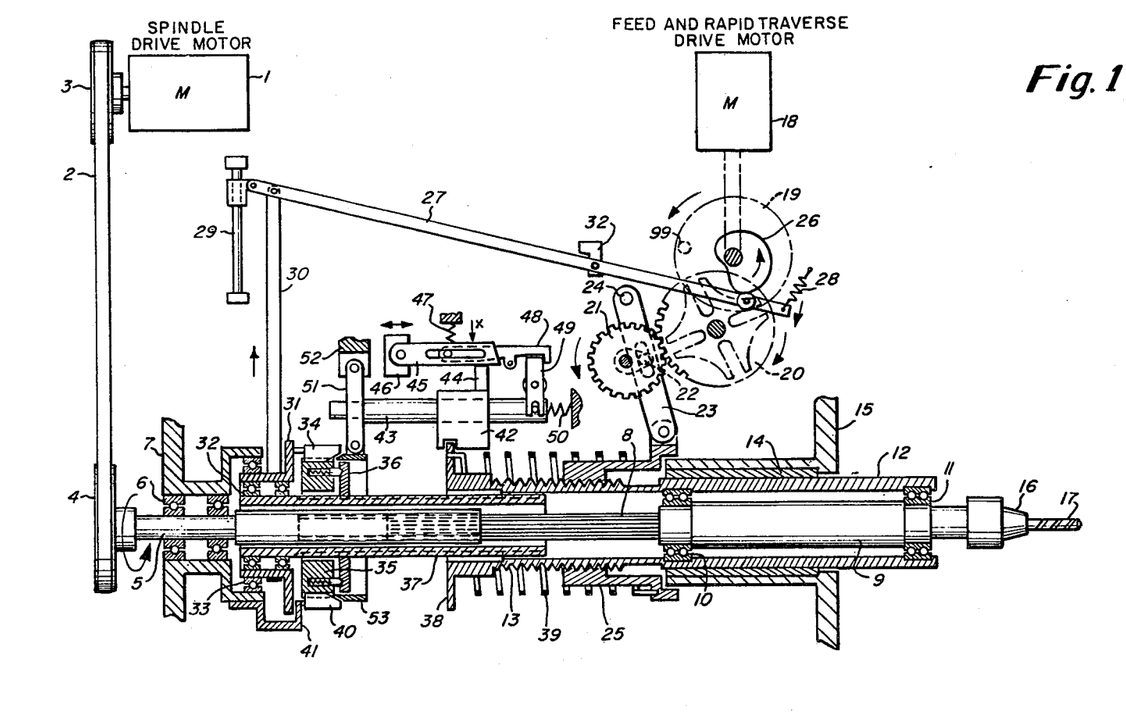
FIG. 1 a diagram showing the scheme of the preferred embodiment of the invention.

FIG. 1 is a diagram showing the scheme of the novel peck drilling machine. The machine employs a varible speed electric motor 1 having a belt 2 passing around a sheave 3 attached to the motor's drive shaft. The belt 2 is looped around a sheave 4 attached to a drive quill 5 which rotates in bearings 6 disposed in a housing 7. The drive quill has a hollow end in which is received the end of a driven quill 8. The drive quill and the driven quill have cooperating splines so that both quills rotate together while the driven quill is able to move axially relative to the drive quill. The driven quill 8 is attached to a spindle 9 that is supported in bearings 10 and 11 disposed in a spindle housing 12 that is part of a feed screw 13. The spindle housing 12 is journalled in a bearing 14 disposed in a housing 15 whereby the spindle housing can both rotate and slide axially along bearing 14. On the end of the spindle which protrudes from housing 11 is fixed a chuck 16 in which a drill 17 is secured. The speed of rotation of the drill is set by adjusting the speed of the variable speed electric motor 1.

The drill 17 is quickly advanced into the work by a rapid traverse mechanism driven by a variable speed electric motor 18. Motor 18 turns the drive wheel 19 of a Geneva mechanism. During 90° in each revolution of drive wheel 19, a Geneva wheel 20 is rotated a quarter turn and then is locked in position while drive wheel 19 completes its remaining 270° of revolution. Geneva wheel 20 is meshed with a gear 21. An arm 22 is arranged to rotate with gear 21. The arm 22 carries a stub shaft that rides in a slot of a lever 23 having one end pivotally mounted to turn on the fixed pivot 24. The other end of lever 23 is pivotally attached to a nut 25 that is mounted on and engaged with the feed screw 13. Consequently, starting with the position of arm 22 shown in FIG. 1, one full rotation of gear 21 causes the drill to be withdrawn away from the work and then rapidly advanced toward the work.

At the end of the rapid advance toward the work, the Geneva drive wheel 19 continues to rotate through 270° to complete its revolution. In that interval, Geneva wheel 20 is locked in position and consequently nut 25, which is held by the lever 23 so that the nut cannot rotate, is unable to move. In that same interval, the spindle 9 is fed at a selected rate toward the work to cause the drill to penetrate into the work. The feed mechanism is driven by the variable speed electric motor 18 through a cam 26 that is attached to the same shaft as the Geneva drive wheel 19 to cause the cam and the Geneva drive wheel to rotate together. A cam rod 27 is held in contact with cam 26 by a spring 28 that pulls one end of the rod against the cam's surface. The other end of the cam rod is restrained to ride along a rail 29. Pivotally secured to the cam rod adjacent its restrained end is a flexible band 30 that is attached to a feed pawl carrier 31. Cam rod 27 is arranged to pivot about a saddle 32 whose position can be moved to any desired location along the length of the cam rod. Because one end of the cam rod is tethered to rail 29, the saddle 32 permits the cam rod to slide in the saddle while the rod pivots on the saddle. Rotation of cam 26 causes cam rod 27 to move along the rail 29 and pull the flexible band in the direction of the arrow. The flexible band 30 is initially wrapped around the feed pawl carrier 31 and causes the feed pawl carrier to rotate as the band unwinds. Feed pawl carrier 31 is mounted on bearings 32 and 33 which enable the carrier 31 to turn. The carrier 31 carries a pawl 34 which engages one of the teeth of a ratchet wheel 35 when the band unwinds. Consequently, the pawl carrier, the pawl, and the ratchet wheel rotate as a unit as the band unwinds. The ratchet wheel is coupled to a drive wheel 36 that is fixed to splined drive feed shaft 37. The coupling is arranged to permit the ratchet to slip on the drive wheel 36 as a safety measure in the event the drill becomes jammed and cannot advance.

In normal operation, the ratchet wheel, the drive wheel, and drive feed shaft 37 rotate as a unit as band 30 unwinds. The splined drive feed shaft 37 is engaged with cooperating splines of feed screw 13 in a manner enabling the feed screw to move axially along shaft 37 while rotating with that shaft. The feed screw has a flange 38 to which is attached one end of a coiled helical return spring 39. The coiled return spring surrounds the feed screw and has its other end attached to the nut 25. Consequently, as band 30 unwinds, drive wheel 36 turns shaft 37 and the feed screw is caused to advance into nut 25 which is held fixed in position. During the advance of feed screw 13, coiled spring 39 is wound and exerts a force tending to rotate the feed screw in the opposite direction. Thus, when cam rod 27 reaches the end of its stroke and reverses its direction to enable band 30 to rewrap itself around the pawl carrier 31, coiled spring 39 exerts a force on flange 38 in the direction to cause the feed screw to reverse its rotation and retract from the feed nut 25. Reverse motion of the feed screw is limited to a small arc by a hitch feed pawl 40 that is engaged with one of the teeth of the ratchet wheel. The hitch feed pawl is mounted in a carrier 41 which can rotate in the reverse direction through a small arc. Upon reaching the limit of the arc, the hitch feed pawl restrains further reverse rotation of the feed screw by preventing reverse movement of the ratchet wheel. The limited reverse movement allowed by the hitch feed mechanism causes the drill to be retracted slightly from the bottom of the hole. Consequently, upon the next actuation of the rapid traverse mechanism, the drill is rapidly withdrawn from the work and is then rapidly advanced into the work to precisely the same position so that the drill is then slightly spaced from the bottom of the hole at the end of the rapid traverse stroke. The drilling feed then starts with the drill close to the bottom of the hole.

The total depth to which the hole is drilled is controlled by a trigger mechanism having a member 42 mounted to slide along a tube 43. The slide member 42 is pushed along the tube by the feed screw flange 38 which is received in a slot in member 42. Protruding from slide member 42 is an arm 44 that rides along a lever 45. The lever is pivoted at one end to a support 46 whose position can be adjusted to set the depth of the hole. A spring 47 urges lever 45 in the direction of the arrow X but that lever is blocked by the arm 44. When arm 44 moves just past the end of lever 45, spring 47 forces the lever to pivot. Pivotal movement of lever 45 causes a trigger bar 48 to release a sear 49 which is pivoted at its midsection. At its lower end the sear has a slot in which is received a pin that is attached to tube 43. Upon release of sear 49, a spring 50 propels tube 43 to the left as viewed in FIG. 1. Tube 43 thereupon causes a lever 51 that is pivoted at its upper end on a fixed support 52 to swing. At its lower end, lever 51 carries a declutch ring 53 which lifts the pawls 34 and 40 off the ratchet wheel 35. Disengagement of the pawls from the ratchet wheel enables the wound return spring 39 to spin the feed screw in the reverse direction and reset the spindle and feed screw assembly to its initial position.

DETAILED DESCRIPTION OF THE PREFERRED EMBODIMENT

Figure 2:
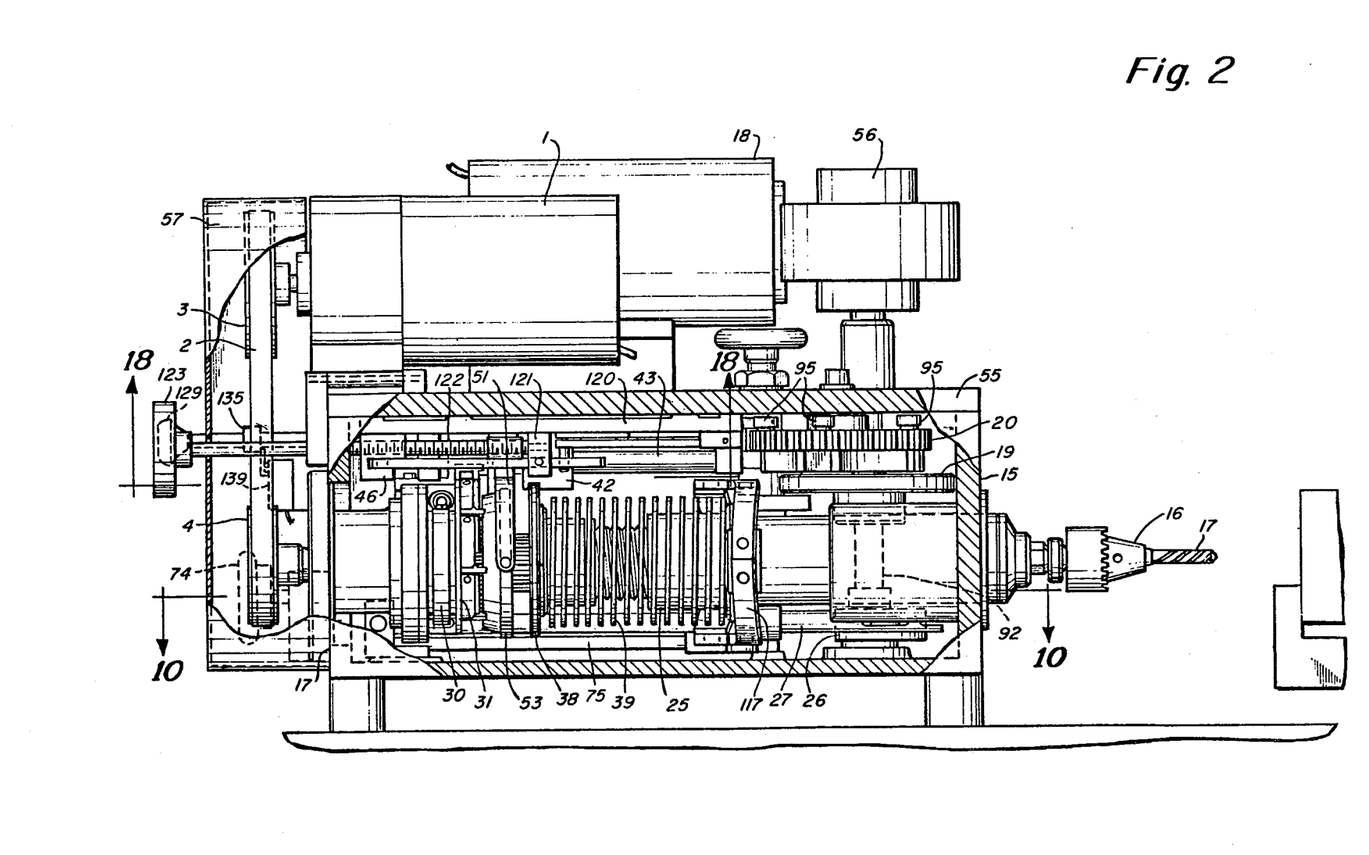
FIG. 2 is a horizontal view of the preferred embodiment of the invention with the side of the machine's housing broken away to show the interior arrangement.
Figure 3:
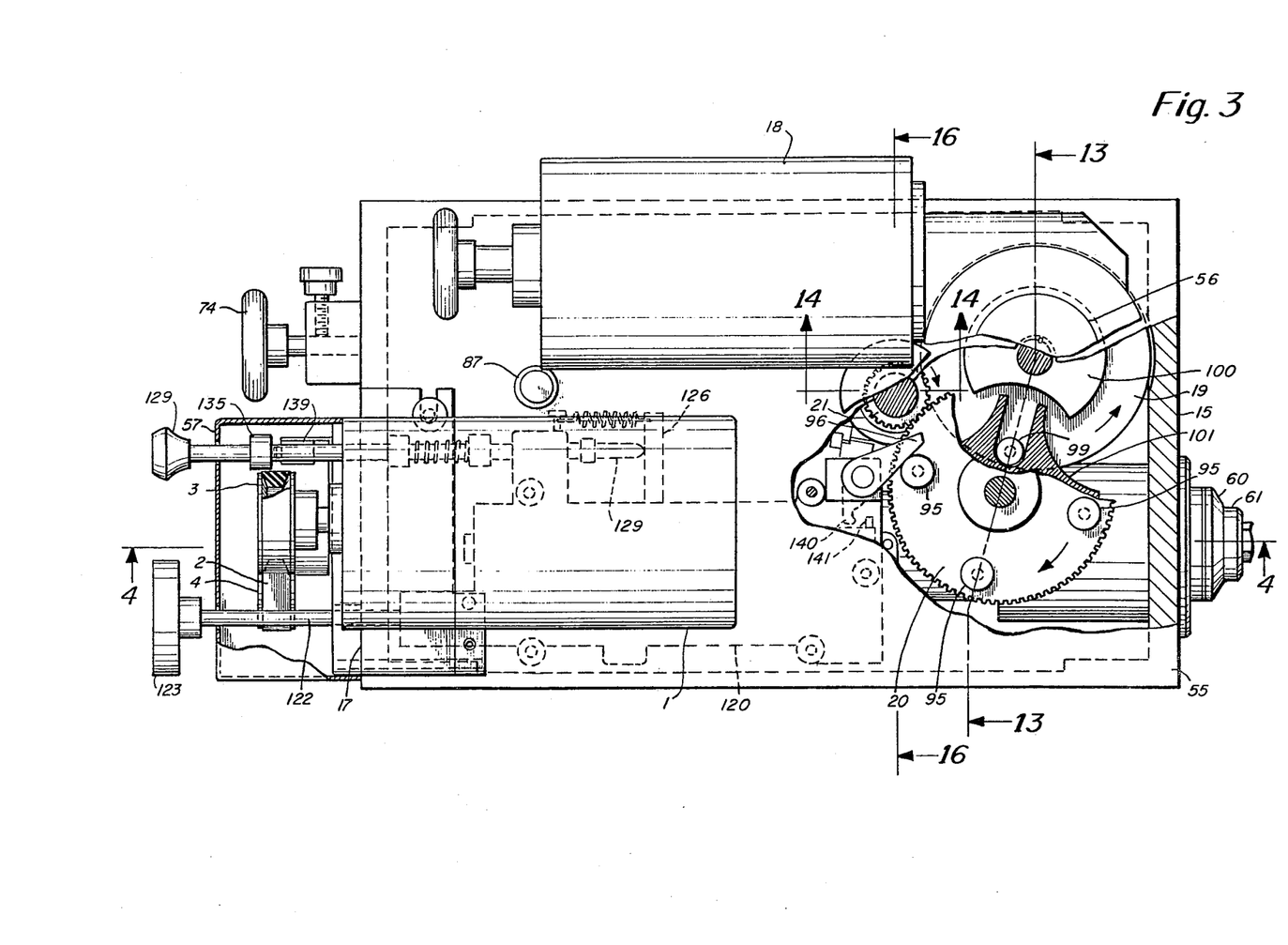
FIG. 3 is a top view of the preferred embodiment with parts broken away to show the Geneva mechanism and the arrangement for recocking the trigger mechanism.

A peck drilling machine embodying the FIG. 1 scheme is illustrated in FIGS. 2 to 20 of the accompanying drawings. In the horizontal view of the peck drilling machine depicted in FIG. 2, parts are broken away to show the machine's internal arrangement. Much of the machine is enclosed in a housing 55 which is illustrated in the form of a rectangular box but which can be of any shape suitable to enclose the mechanisms employed in the machine. Situated upon housing 55, as shown in FIGS. 2 and 3, are the variable speed electric motors 1 and 18 whose speeds can be set by conventional controls. The motor 18 drives a speed reducing mechanism 56 which, in turn, drives the shaft that carries the Geneva drive wheel 19 and the cam 26. Motor 1 drives the spindle of the drilling machine through the belt 2 that is looped around the sheaves 3 and 4. As a precaution, a guard housing 57 encloses the belt drive. Clearly visible in FIG. 2 is the helical return spring 39 that is disposed around the feed screw 13 and which is attached at one end to the flange 38 of the feed screw and has its other end attached to feed nut 25. Extending from the front end of the machine is the spindle which carries the chuck 16 in whose jaws a drill bit 17 is clamped.

Figure 4:
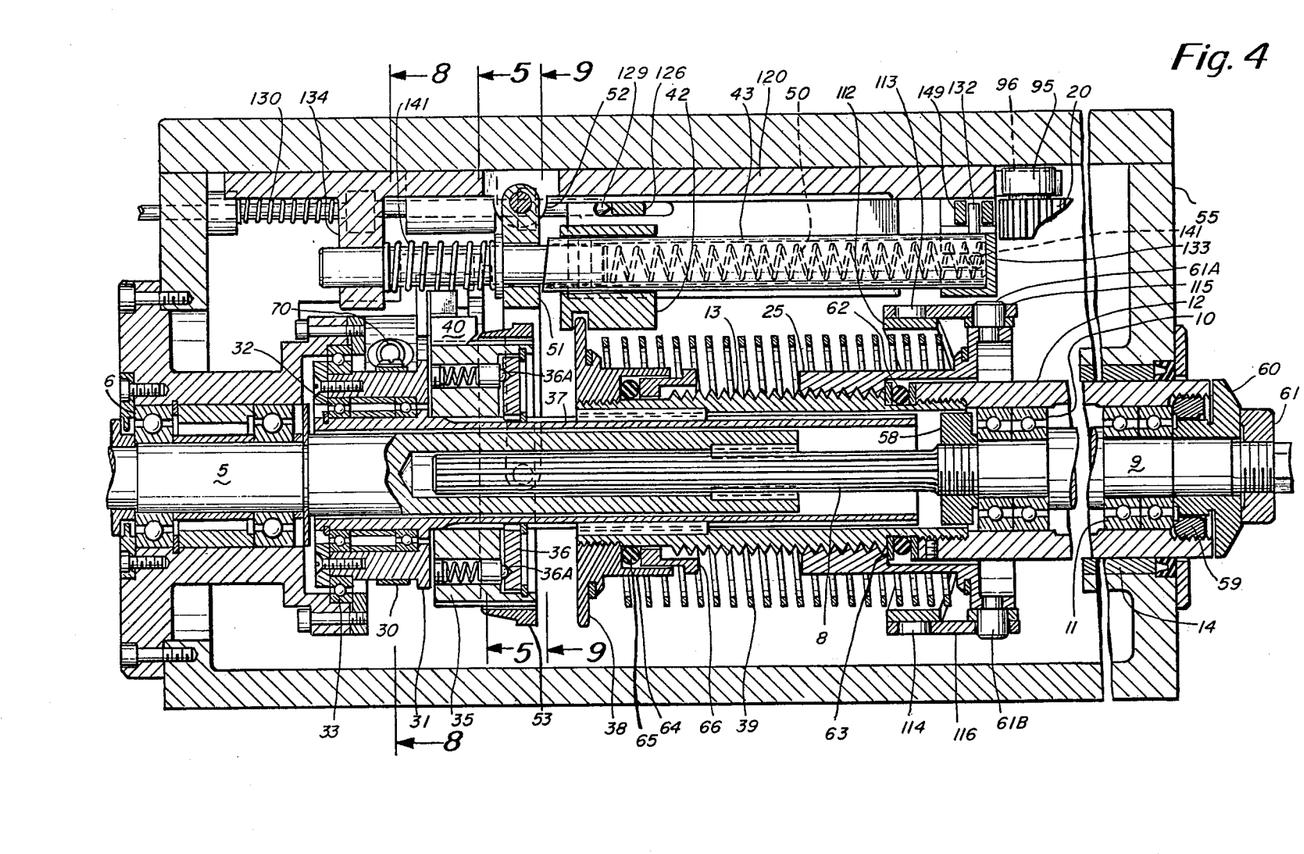
FIG. 4 is an enlarged horizontal sectional view of the preferred embodiment taken along the vertical parting plane 4—4 of FIG. 3 and showing the spindle drive arrangement.

Referring now to FIG. 4, the drive quill 5 is supported on bearings 6 which are situated in a housing 7 attached to the frame 55 of the machine. The drive quill is partially broken away to show its splined hollow interior in which the splined driven quill 8 is received. Attached to driven quill 8 is the spindle 9 which is supported on ball bearings 10 and 11 situated in the spindle housing 12. The rear ball bearings 10 are retained within the spindle housing by a nut 58 threaded onto quill 8. The front bearings 11 are retained within the spindle housing by a nut 59 that is threaded into the sleeve. Between the front and rear bearings, the spindle is enlarged in diameter so that when the housing is moved axially, the spindle must move axially with the housing. Fixed to the rear of spindle housing 12 is the hollow feed screw 13. Normally the spindle housing and feed screw rotate as a unit and those members could be made of one piece. In those cases where it may be desirable to rotate the feed screw but not the housing, the connection between the two members would be a suitable thrust bearing. In the preferred embodiment, the spindle housing is attached to the feed screw so that both the housing and the feed screw move as a unit and therefore the spindle housing is journalled in a bronze bearing 14 to facilitate the housing's movement. That construction enbles the spindle to rotate on the ball bearings while the entire assembly can move longitudinally along the axis of the machine to feed the drill into the work. To protect the front bearings 11, a slinger ring 60 is secured on the spindle 9 by a nut 61 that keeps the ring gainst the inner race member of the ball bearing. Mounted on feed screw 13 is the feed nut 25 which has two opposed bosses 61A and 61B positioned on a vertical centerline passing diametrical through the nut and the feed screw. A resilient O-ring 62 is disposed, as shown in FIG. 4, between a washer 63 and a shoulder of housing 12. The O-ring acts as a shock absorber to prevent nut 25 from locking up on the feed screw. Attached to the left end of the feed screw, as viewed in FIG. 4, is the flange 38 which carries a shroud 64 that extends over the feed screw. Within shroud 64 is positioned a resilient O-ring 65 that can be compressed against the flange by a buffer ring 66. Thus when the nut and flange are driven together, the buffer ring compresses the O-ring 65 and absorbs some of the energy so that the nut does not lock up on the feed screw. At both of the extreme positions of the feed screw, the resilient O-rings act as resilient stops to prevent the feed screw and the feed nut from locking together.

Assuming feed nut 25 is immovably held in position, rotation of feed screw 13 in the direction advancing the feed screw into the nut causes helical spring 39 to be wound. The wound spring constantly exerts a force on flange 38 that tends to turn the feed screw in the counter direction. The drill is fed into the work when the nut is held fixed and the feed screw is turned to advance the screw into the feed nut. Because in a peck drill the drill is repetitively fed into the work and withdrawn after each "peck", the feed screw is arranged to be repetitively fed into the nut until the feed screw has been advanced the distance to drill the hole to the required depth. Upon reaching that depth, the trigger mechanism releases the ratchet wheel to permit the wound return spring to unwind and turn the feed screw in the opposite direction until the feed screw is returned to the position it had at the start of the drilling operation. O-ring 69 prevents the feed screw from locking up on the feed nut 25 by absorbing some of the energy when the feed screw approaches its limiting position on its return to the initial position.

THE RATCHET FEED

The feed screw 13 depicted in FIG. 4 is a hollow tube having internal splines engaged with the splines of shaft 37. That arrangement enables the feed screw to be turned by rotation of shaft 37 while permitting the feed screw to slide longitudinally along shaft 37. Drive shaft 37 is mounted, as shown in FIG. 4, on ball bearings 32 which permit that shaft to turn. Mounted on shaft 37 so that it can rotate relative to the shaft is a ratchet wheel 35. The ratchet wheel is coupled to the drive wheel 36 by ball plungers 36A recessed in the ratchet wheel which engage detents in the drive wheel. The drive wheel has internal splines which receive the splines of shaft 37 so that the drive wheel and shaft rotate as a unit. The coupling between the ratchet wheel and the drive wheel is broken in the event the spindle is unable to advance toward the work. The breakable coupling is a safety feature that prevents the machine from being damaged in the event the drill breaks or something else occurs that prevents the spindle from being fed toward the work. The detented coupling between the ratchet wheel and the drive wheel is arranged to give way when the torque at the coupling exceeds a predetermined value so that the ratchet wheel can continue to turn relative to the drive wheel.

Figures 5, 6, 7:
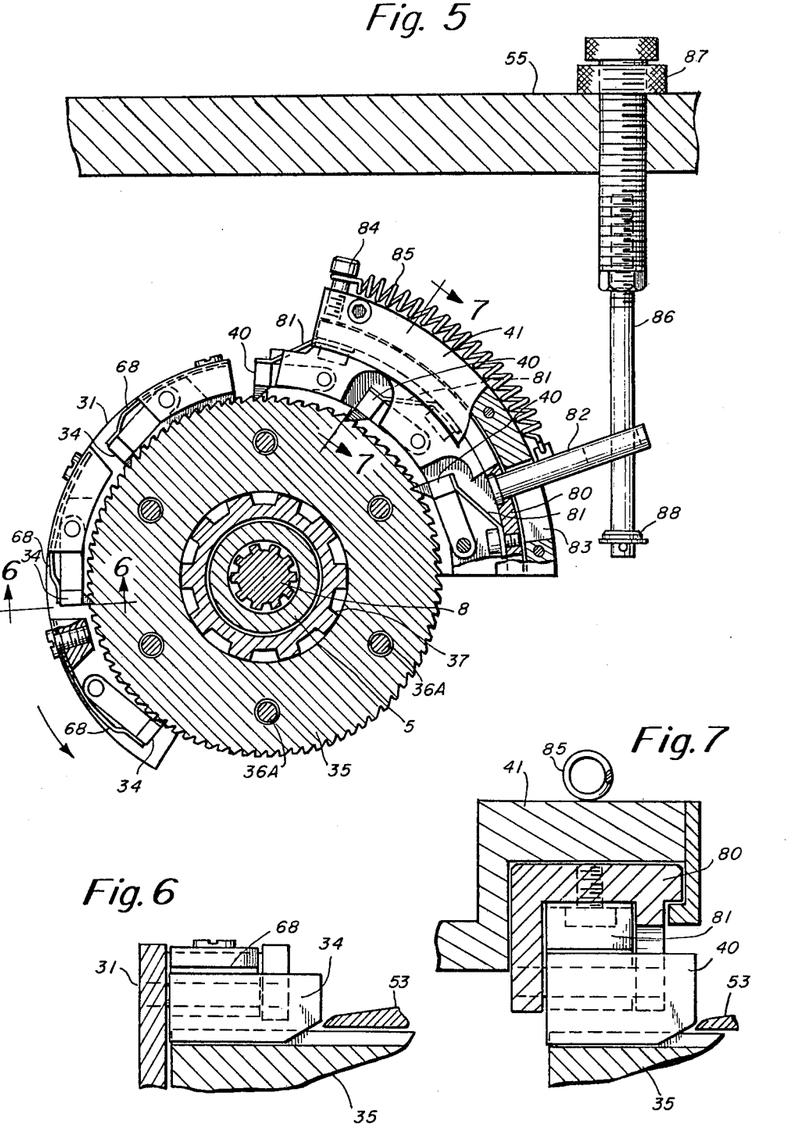
FIG. 5 is a cross-sectional view taken along the vertical parting plane 5—5 of FIG. 4 and shows the ratchet feed and the hitch feed arrangements.
FIG. 6 is a detailed view of the ratchet feed taken along the plane 6—6 of FIG. 5 and shows the incline on the pawl that facilitates lifting of the pawl by the declutch ring.
FIG. 7 is a detailed view of the hitch feed taken along the plane 7—7 of FIG. 5 and shows the arrangement by which the pawl can be lifted by the declutch ring.

Referring again to FIG. 4, the feed pawl carrier 31 is shown mounted for rotation on ball bearings 32 and 33. The feed pawl carrier, as best depicted in FIG. 5, carries a plurality of pawls 34 which are disposed about a segment of the periphery of the ratchet wheel. The pawls are spaced so that if three pawls are used, succeeding pawls are spaced apart by an integral number of teeth plus ⅓ the distance between adjacent teeth. That spacing insures that at least one of the three pawls will engage a tooth of the ratchet wheel at a setting that changes by ⅓ of the teeth separation. By thus spacing the pawls, the teeth of the ratchet wheel need not be as fine as would otherwise be necessary for the same detenting action. Each of the pawls is pivotally mounted on the carrier 31 and is pressed against the ratchet wheel by a leaf spring 68. To facilitate lifting of the pawls by the declutch ring 53, each of the pawls is undercut as shown in FIG. 6 to present a sloping surface to the declutch ring. It is evident that the feed pawl carrier need carry only one pawl where a reduction in the fineness of the control of the feed is acceptable.

Figure 8:
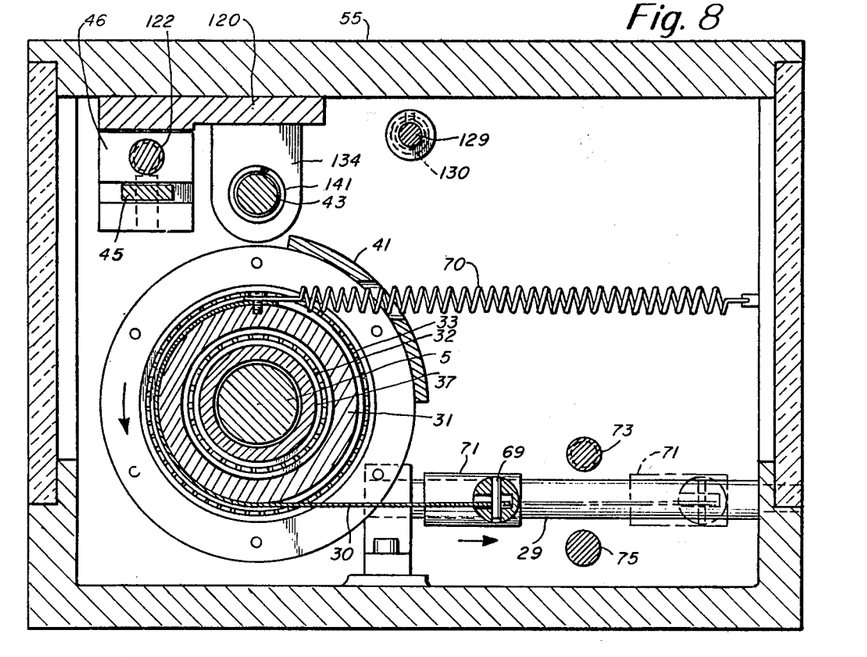
FIG. 8 is a sectional view taken along the parting plane 8—8 of FIG. 4 and shows the flexible band coupling the peck feed mechanism to the ratchet feed pawl carrier.
Figure 9:
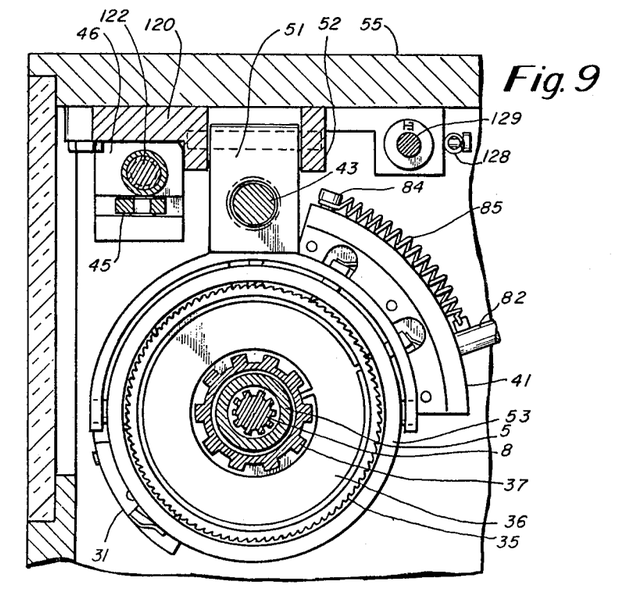
FIG. 9 is a sectional view taken along the parting plane 9—9 of FIG. 4 and shows an end view of the declutch ring.
Figure 10:
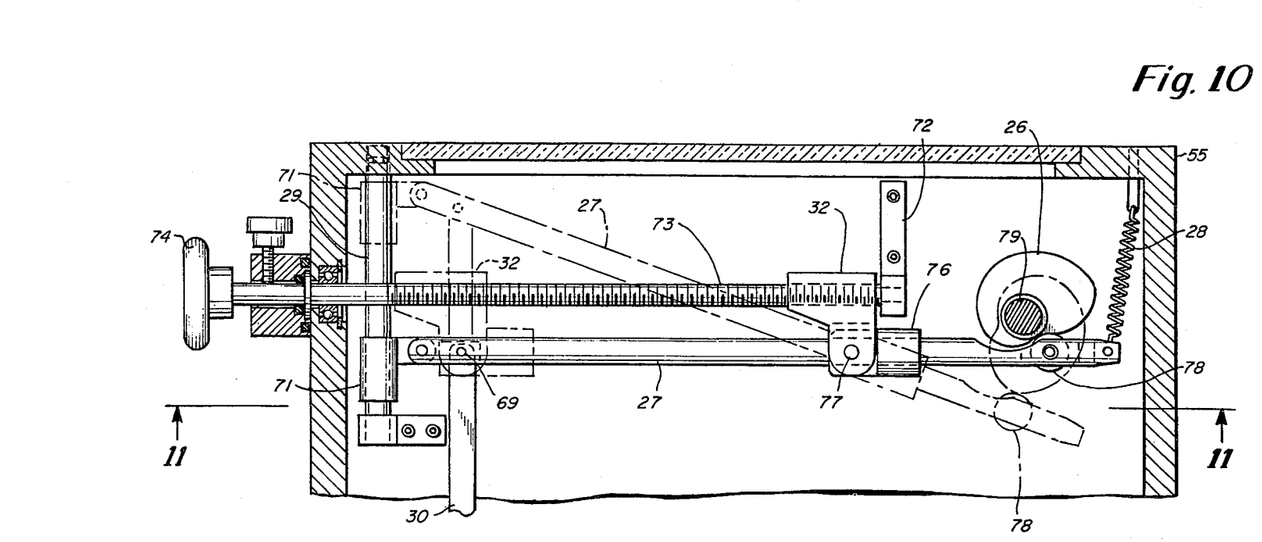
FIG. 10 is a top view of the infinitely adjustable peck feed mechanism taken long the parting plane 10—10 in FIG. 2.

When one of the pawls is engaged with a tooth of ratchet wheel 35, rotation of carrier 31 in the counterclockwise direction indicated by the arrow in FIG. 8 causes the ratchet wheel to turn with the carrier. Inasmuch as the ratchet wheel is coupled to drive wheel 36 which is splined to drive shaft 37 and the drive shaft is splined to feed screw 13, rotation of the ratchet wheel in the direction of the arrow causes the feed screw to advance into the feed nut 25 and feed the drill toward the work. To cause the carrier to rotate in the direction to feed the drill toward the work, one end of flexible band 30 is attached to the carrier as depicted in FIG. 8. The band is wrapped around the carrier and is caused to unwind by the peck feed mechanism which has its cam rod 27 pivotally attached to the other end of the flexible band by a pivot pin 69. As the band unwinds, a spring 70 is stretched and causes the band to be rewound on the carrier following the end of the forward feed stroke of the peck feed mechanism.

THE INFINITELY ADJUSTABLE PECK FEED MECHANISM

Referring now to FIGS. 8, 10, 11, and 12, the cam rod 27 is shown to have a forked end with the band 30 situated in the fork. Band 30 is pinned in position by the pin 69 which permits the band end to pivot relative to the cam rod. At the end adjacent the band connection, the cam rod is pivotally attached to the tongue of a slide member 71 that is slidable along the guide rod 29. The guide rod is supported by the frame of the machine and is disposed so that the band is pulled along a straight line as the end of the member 71 slides along the guide rod. The band is pulled along a line perpendicular to the longitudinal axis of the drive quill. Consequently, the band exerts a turning force on pawl carrier 31 without exerting any lateral force on that carrier.

Figure 11:
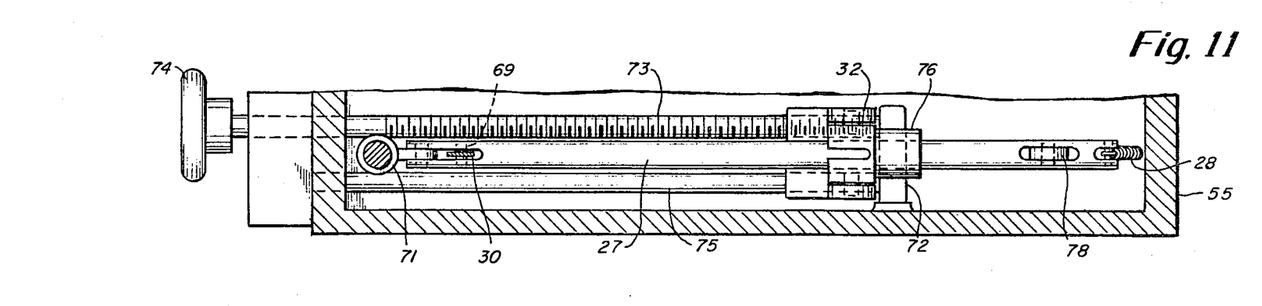
FIG. 11 is a horizontal view taken along the parting plane 11—11 of FIG. 10 and shows a side view of the infinitely adjustable peck feed mechanism.
Figure 12:
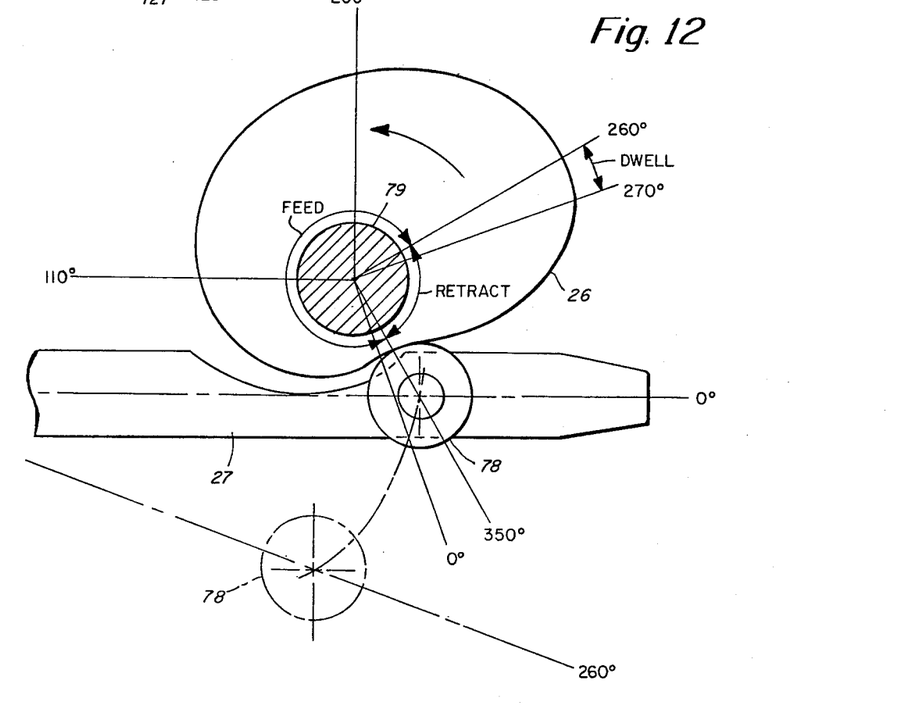
FIG. 12 is a detailed view showing the cam and cam follower arrangement employed in the peck feed mechanism.

Supported at one end in a support 72 secured to the frame of the machine is an adjusting screw 73 whose other end protrudes through the side of the machines's housing and is furnished with a handle 74 by which the screw can be turned. Disposed directly below the screw and parallel with it is a support rod 75. Mounted on the support rod and on the adjusting screw 73 is a saddle 32. To enable the position of the saddle to be adjusted, the screw 73 is mated with threads in the saddle so that turning of the screw causes the saddle to move along the screw. Pivotally attached to the saddle is a slide ring 76 encircling the cam rod. As shown in FIG. 11, slide ring 76 is slotted to receive the band 30 so that the pivotal axis 77 of the slide ring can be aligned with the pivotal axis 69 of band 30 when the saddle is moved to its extreme left position, as viewed in FIG. 11. The right end of the cam rod carries a cam follower 78 that is pulled against the cam 26 by the spring 28 which is secured to the end of the cam rod and to the frame 55. The cam 26 is fixed to a shaft 79 so that when the shaft turns the cam follower is pushed to the maximum stroke position illustrated in phantom in FIGS. 11 and 12. The extent of movement of the tethered end of the cam rod, consequently, depends upon the position of the pivotal axis of the saddle. As indicated in FIG. 12, the surface of the cam is configured so that for the 260° of rotation of shaft 79, the cam follower is pushed outwardly and causes the left end of the cam rod to move at a linear rate as slider 71 moves along the guide rod 29. That is, the left end of the cam rod moves at a rate that is linear with respect to the rotation of shaft 79. For the next 10° of shaft rotation, the cam follower dwells at its maximum stroke position. During this dwell period, the drill is at the bottom of the hole. In the next 90° of shaft rotation, the cam follower moves inwardly and returns to its initial position where it is closest to the shaft 79. By adjusting the position of the saddle, the feed stroke of the band 30 can be regulated over a continuous range from maximum stroke to zero stroke. The maximum stroke is obtained when the saddle is in the position illustrated in FIG. 11 where it is nearly against the support 72. The zero stroke is attained when the saddle is moved to the extreme left where the pivotal axis of slider 76 is directly over and aligned with the pivotal axis of band 30.

Because the end of the cam rod which slides along the guide rod 29 moves at a linear rate, the drill is fed into the work at a uniform rate. To help break up the chips as the drill penetrates into the work, the cam can have flats on it which will slightly alter the feed rate. By adjusting the position of the saddle by means of the adjusting screw, the feed rate is continuously adjustable from the maximum rate for which the machine is designed to zero rate. If desired, two cams can be provided on the shaft 79 with a mechanism for shifting the cams to place one or the other in contact with the cam follower. The two cams can be similar, except that one of the cams is provided with flats to intermittently alter the feed rate to help break up the chips.

At the end of the 10° dwell period, the drill is at the bottom of the hole. If the drill is now rapidly retracted to clear the chips and rapidly advanced back into the hole, the drill may strike the bottom of the hole and break or begin to drill crooked. To avoid damaging the drill or the drilling of a crooked hole, the drill must not be allowed to bottom in the hole on its rapid advance. Consequently, a hitch feed mechanism is provided which does not permit the drill to bottom in the hole on its rapid advance. For example, if in the first peck the drill advanced 0.050" into the work, the hitch feed will subtract 0.002" or whatever other value is set so that on the next rapid advance, the drill will be rapidly advanced to within 0.002" of the bottom of the hole and then will be slowly fed into the work at the preset drill rate.

THE HITCH FEED

The hitch feed mechanism comes into play at the end of the 10° dwell period. The hitch feed mechanism is illustrated in FIGS. 5 and 7 and employs an arcuate carrier 41 immovably fastened to the housing 55. The arcuate carrier is concentric with the ratchet wheel 35 and extends around a segment of that wheel's periphery.

Slidably disposed in the carrier 41 is a carriage 80 carrying a plurality of pawls 40 which are biased by springs 81 to cause at least one of the pawls to engage a tooth of the ratchet wheel 35. The hitch feed pawls 40 are spaced in the same manner as feed pawls 34. That spacing insures that at least one hitch feed pawl will engage a tooth of the ratchet wheel at a setting that changes by one third of the spacing between adjacent teeth. The carriage 80, as depicted in FIG. 7, slides in the carrier 41. The carriage 80 carries a post 82 that protrudes through a slot in the carrier. Another post 84 is affixed to the carrier and a tension spring 85 is attached to both posts. Extending down from the machine's housing 55 is a rod 86. The lower end of rod 86 extends through a slot in post 82. The upper end of rod 86 is threaded into the housing 55 in a manner permitting the extent of the projection of that rod into the housing to be changed. A lock nut 87 is provided on the upper threaded portion of rod 86 to lock the rod in position. The lower end of rod 86 carries a stop member 88 which limits the movement of post 82.

Referring to FIG. 5, counterclockwise rotation of carriage 80 is stopped by post 82 reaching the upper end of slot 83 in the carrier 41. The carriage is in this position while the machine is feeding the drill into the work and it is held in that position by the tension of spring 85. While the ratchet wheel is rotating in the direction to feed the tool into the work, pawls 40 of the hitch feed ratchet over the teeth of the ratchet wheel. At the end of the feed stroke, the feed pawl carrier 31 begins to rotate in the counter direction (here assumed to be clockwise) because the cam rod 27 commences to return to its starting position to permit band 30 to be rewound on the carrier 31. The instant the ratchet wheel starts to rotate clockwise, one pawl of the hitch feed engages a tooth of the ratchet wheel. The return spring 39 provides the force for rotating the ratchet wheel in the clockwise direction. The engaged pawl of the hitch feed pushes the carriage clockwise until post 82 reaches the end of the travel permitted by rod 86, at which point further clockwise rotation of the ratchet wheel is stopped while the feed pawls 34, under the force of the retracting spring 76, ratchet back to their starting position for the next feed stroke.

The foregoing operation of the hitch feed results in the feed screw withdrawing in the reverse direction through the feed nut by a distance governed by the travel permitted to post 82. The function performed by the hitch feed is essential to the successful operation of the peck drilling machine. After each feed stroke of the machine, the drill is slightly retracted so that on the next rapid advance of the drill back into the hole, the drill does not bottom in the hole.

RAPID TRAVERSE MECHANISM

The rapid traverse mechanism speeds up the peck drilling operation by quickly retracting the drill to clear the chips and then rapidly advancing the drill to a point close to the bottom of the hole where farther advance of the drill is then controlled by the previously described feed mechanism. Just prior to the retraction of the drill by the rapid traverse mechanism, the hitch feed comes into operation and causes the feed screw to move back a preset amount relative to the feed nut so that the drill does not strike the bottom of the hole when it is quickly advanced by the rapid traverse mechanism.

Figure 13:
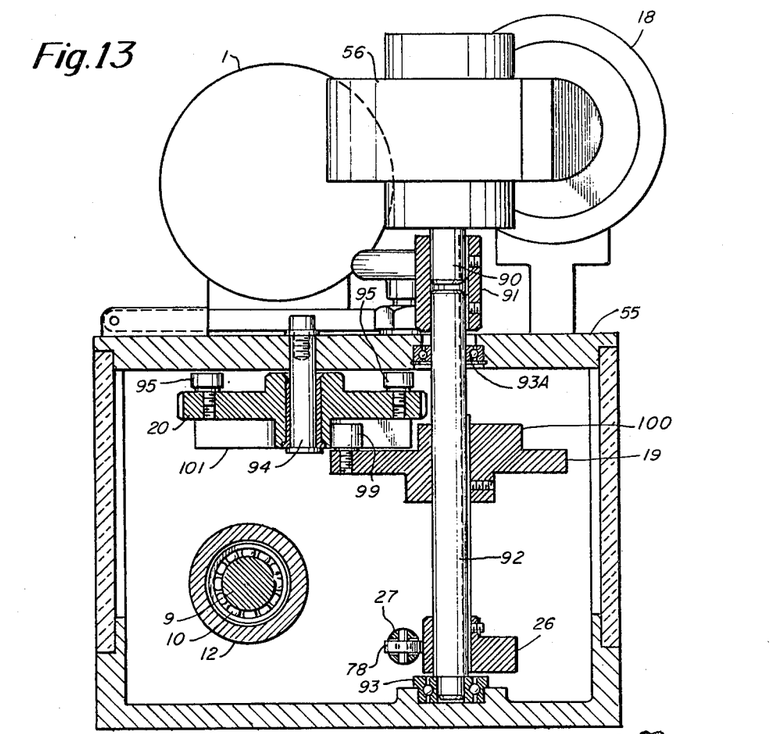
FIG. 13 is a sectional view taken along the parting surface 13—13 of FIG. 3 and shows the arrangement for driving the Geneva mechanism.
Figure 14:
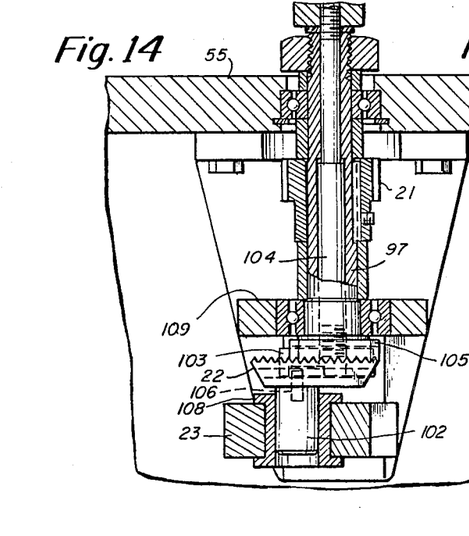
FIG. 14 is a sectional view taken along the parting plane 14—14 of FIG. 3 and shows the arrangement for driving the rapid traverse mechanism.
Figure 15:
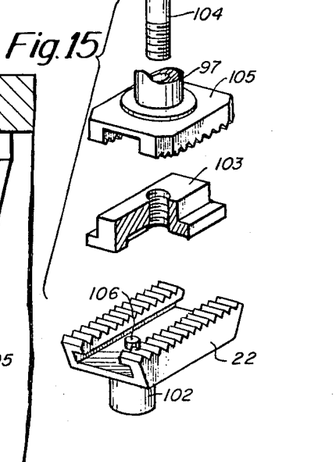
FIG. 15 is a view showing in detail the arrangement that permits the throw of the arm 22 to be adjusted.

Referring now to FIGS. 1, 2, and 13, the rapid traverse mechanism is driven by variable speed electric motor 18 through speed reducer 56 which, as shown in FIG. 13, has its drive shaft 90 coupled by a collar 91 to the shaft 79 that is supported for rotation on ball bearings 93 and 93A disposed in the machine housing 55. Fixed on shaft 79 to rotate with it are the cam 26 which drives the feed mechanism and the drive wheel 19 which turns the Geneva wheel 20 that is carried by a stub shaft 94 extending down from the machine housing. Four cam followers 95 are fixed to Geneva wheel 20 and, as shown in FIG. 3, operate the cocking lever 96 of the trigger assembly that is later described herein in greater detail. The periphery of the Geneva wheel is formed by gear teeth which engage the teeth of the gear 21. As shown in FIGS. 14 and 15, gear 21 is fixed to a hollow shaft 97 that carries the arm 22.

The Geneva wheel 20 makes one quarter of a revolution in each full turn of the driver wheel 19. As best shown in FIG. 3, a pin 99 on the driver wheel engages one of the slots in the Geneva wheel during 90° of rotation of the driver and moves the Geneva wheel through one quarter of a turn. In the remaining 270° of rotation of driver 19, the Geneva wheel is locked in position by the circular segment 100 of the driver which enters a circular cut-out 101 of the Geneva wheel. In that same 270° of rotation, power from the speed reducer drive shaft 90 is transmitted by shaft 79 along a second path through the feed cam 26 to the previously described feed mechanism. As indicated in FIG. 1, Geneva wheel 20 has four radially extending slots, each of which is engaged in sequence by the pin 99 of the driver wheel with a 270° interval between successive engagements.

As best shown in FIGS. 14 and 15, arm 22 is arranged to rotate with shaft 97 and that arm carries a stub axle 102 adjacent one end. To enable the length of arm 22 to be changed, the arm has serrations on its upper surface disposed on either side of an inverted T-shaped channel. Disposed in the channel is an inverted T-shaped clamp member 103 having a central threaded bore into which is screwed the threaded end of a rod 104 that extends down through the hollow shaft 97. Attached to the lower end of shaft 97 is a member 105 having serrations on its lower surfaces. By rotating rod 104 to pull member 103 upwardly, member 103 lifts the arm 22 and clamps that arm against the member 105 so that the serrations on arm 22 interlock with the serrations on member 105 and securely fix arm 22 in position. Rotation of rod 104 in the opposite direction enables clamp member 103 and arm 22 to drop down until the serrated edges disengage. The arm 22 can then be adjusted to change its throw. To prevent arm 22 from sliding off the clamp member during adjustment, a pin 106 is provided on the arm to ride in a slot in member 103. The adjustment of arm 22 relative to the clamp is thereby limited to the extent permitted by the pin and slot.

Figure 16:
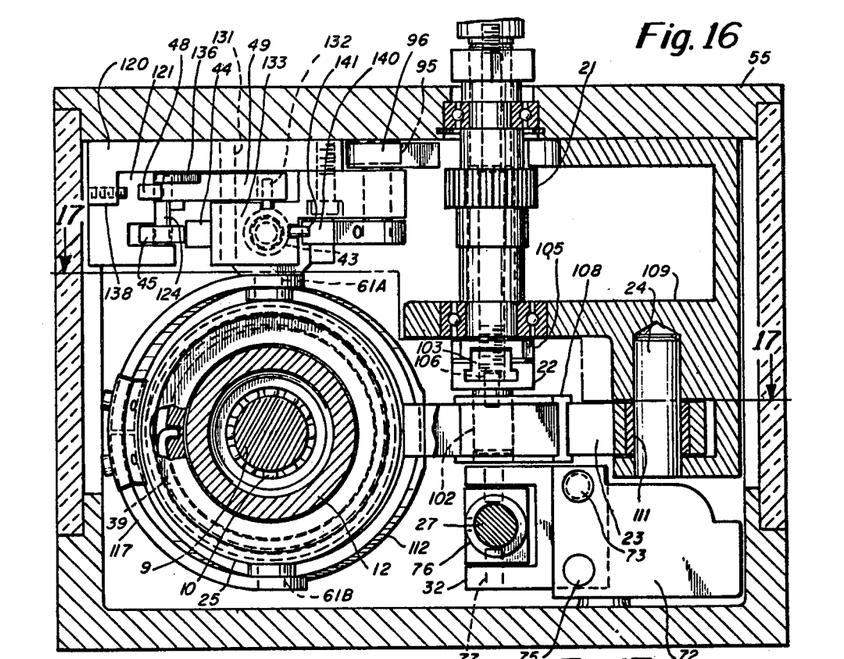
FIG. 16 is a sectional view taken along the parting plane 16—16 of FIG. 3 and shows the rapid traverse mechanism.
Figure 17:
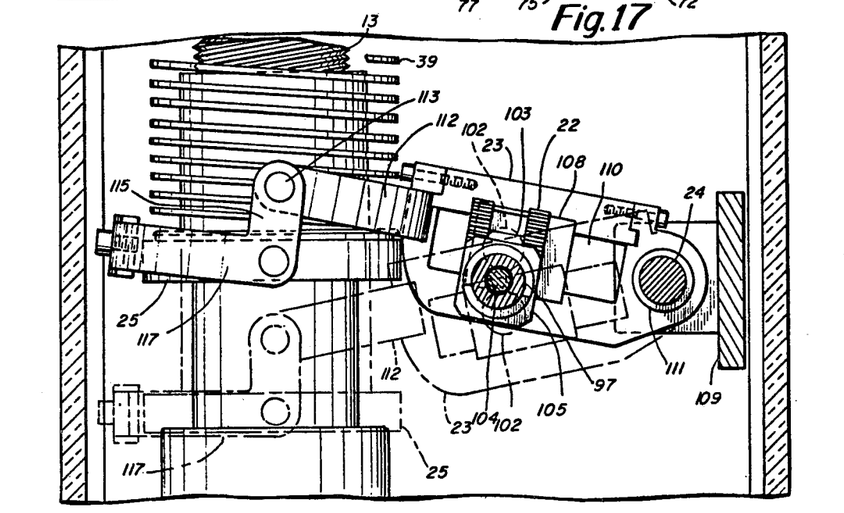
FIG. 17 is a top view taken along the parting surface 17—17 of FIG. 16 and shows the connection of the crank arm of the rapid traverse mechanism to the feed nut.

Referring now to FIGS. 14, 16, and 17, the stub axle 102 on arm 22 protrudes into a slider 108 that reciprocates in the slot in the crank arm 23 (FIG. 1). As best shown in the cross-sectional view of FIG. 16 and the top plan view of the rapid traverse mechanism shown in FIG. 17, crank arm 23 is arranged to swing about the shaft 24 which is held by a bracket 109 secured to the top of the machine housing 55. As best shown in FIG. 17, crank arm 23 has a rectangular slot 110 in which the slider 108 reciprocates as the arm 22 rotates. Shaft 24 preferably is hollow to provide a passage for lubricant to flow to the pivot bearing 111 and to the slider 108 in the crank arm 23. As depicted in FIGS. 4 and 16, the outer end of crank arm 23 carries a yoke 112 having opposed vertically aligned bosses 113 and 114. Pivoted on boss 113 is a link 115 (FIG. 4) which has its other end pivoted on boss 61A extending from nut 25. Similarly a link 116 is pivoted on boss 61B. The links 115 and 116 are tied together by a semicircular yoke 117 that extends around the nut 25. The yoke 117 prevents the nut from turning relative to the feed screw and eliminates radial loads on the nut by assuring that the forces of drilling acting on the nut are effectively parallel to the longitudinal axis of the spindle. This manner of supporting the nut, consequently, causes the nut to float on the feed screw.

As arm 22 rotates, slider 108 moves to and fro within the rectangular opening in crank arm 23 and causes that arm to swing back and forth about the pivot shaft 24. Rearward movement of crank arm 23 causes nut 25 to be rapidly moved away from the work to the full line position shown in FIG. 17. Forward movement of crank arm 23 causes the nut 25 to be rapidly advanced toward the work as indicated by the position shown in phantom in FIG. 17. Inasmuch as the nut is engaged with the feed screw 13, movement of the nut causes the spindle assembly to move with the nut. Consequently, the cutting tool is rapidly retracted from the work to clear the hole of chips and the tool is then rapidly advanced back into the hole by action of the rapid advance mechanism.

THE TRIGGER MECHANISM

The trigger mechanism controls the total extent the spindle feeds and thus controls the depth of the hole drilled in the work. Upon reaching the preset depth, the trigger mechanism operates to terminate the drilling cycle by allowing the drill to be withdrawn from the work and restores the mechanism to an initial state from which a new drilling cycle can begin. The trigger mechanism is constructed to be unaffected by the speed at which the spindle is fed and is unaffected by the operation of the rapid traverse mechanism.

Figure 18:
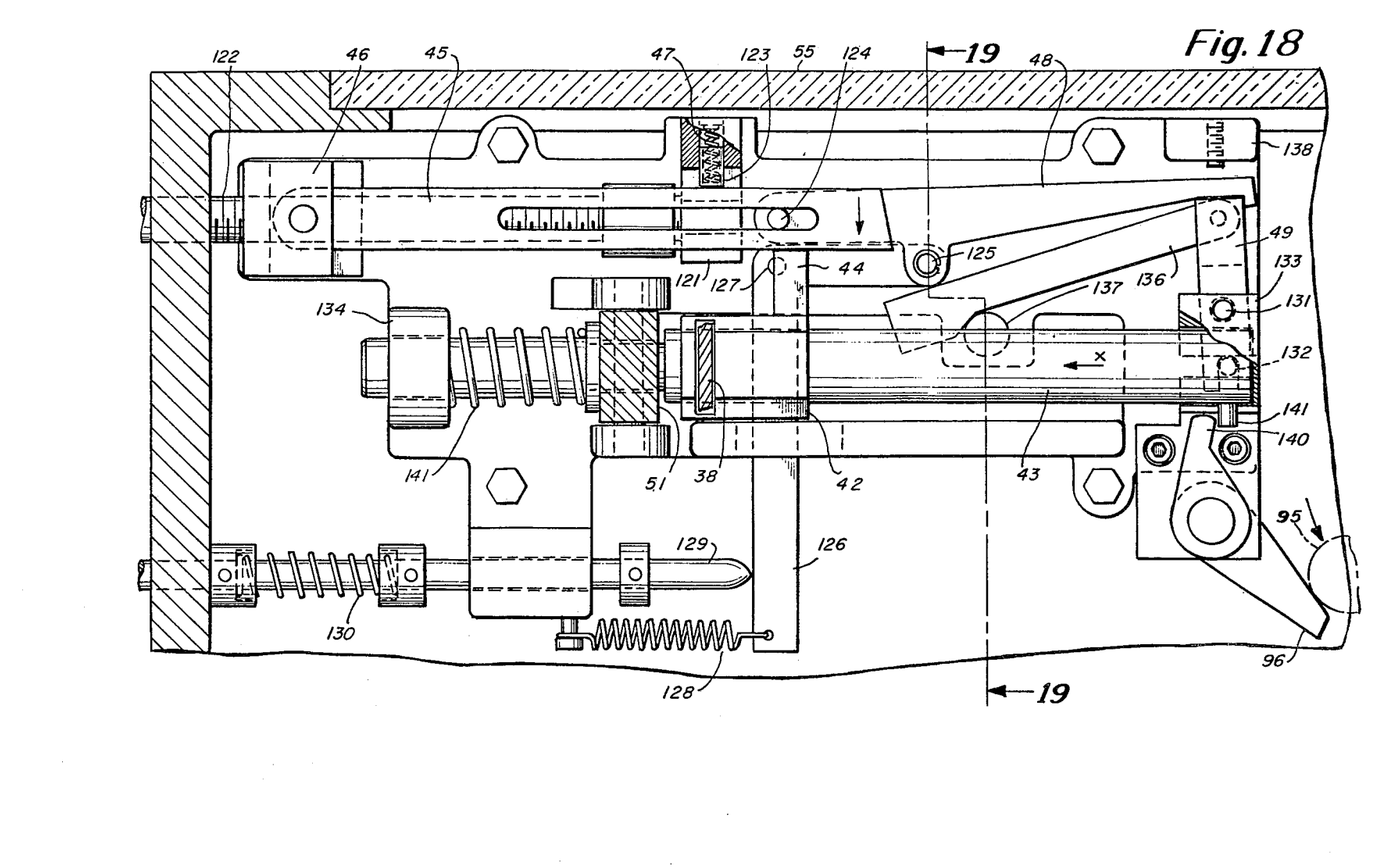
FIG. 18 is a bottom view of the trigger mechanism taken along the parting plane 18—18 of FIG. 2 and shows the cocked trigger mechanism set for minimum hole depth.
Figure 19:
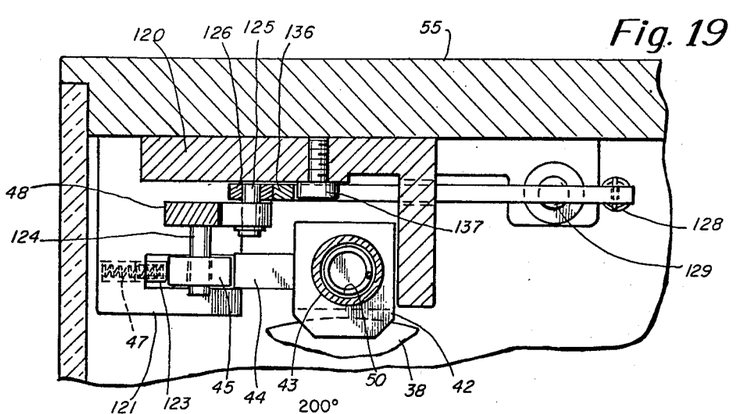
FIG. 19 is a sectional view of the trigger mechanism taken along the parting surface 19—19 of FIG. 18.
Figure 20:
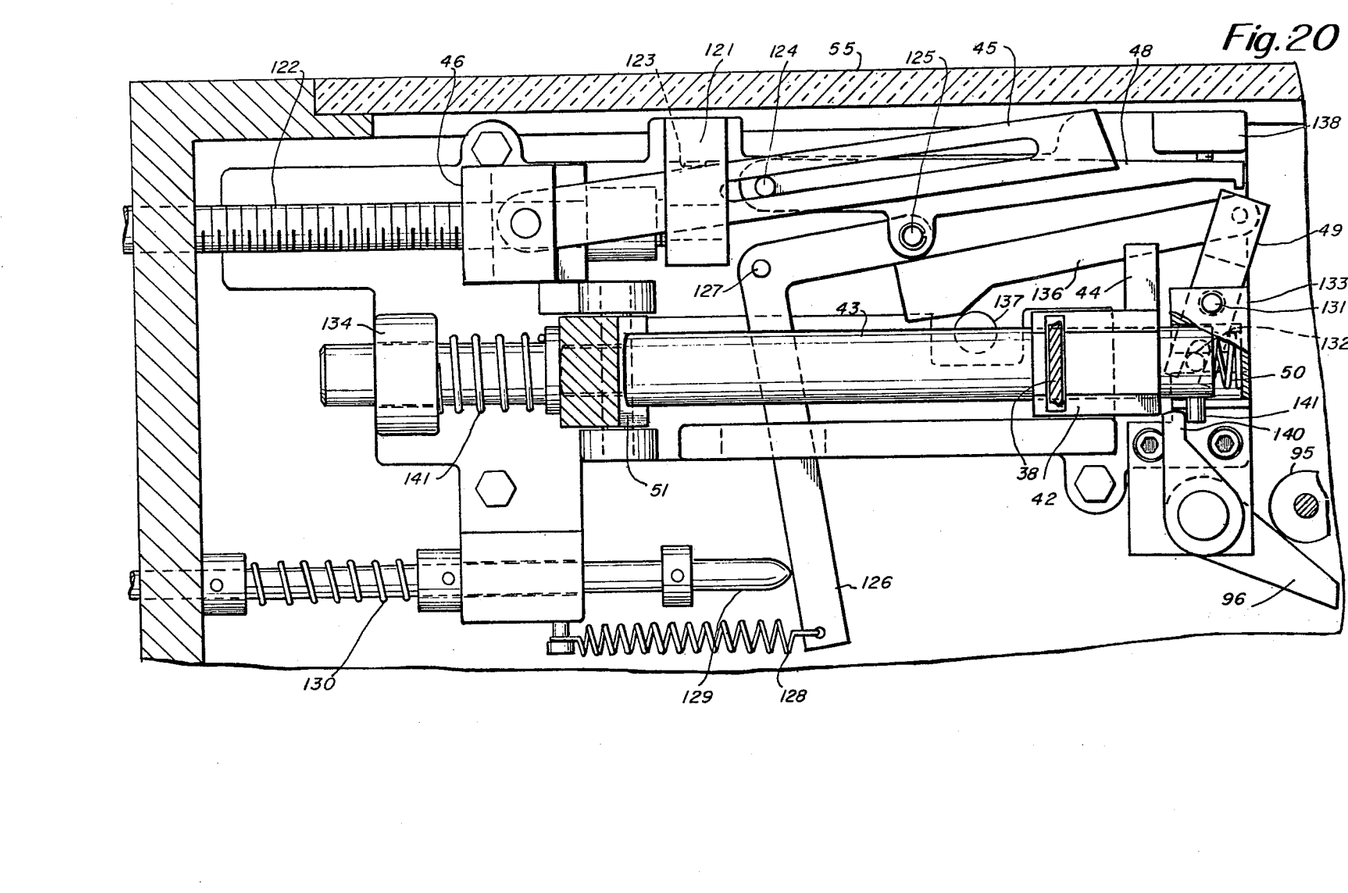
FIG. 20 is a bottom view of the trigger mechanism and shows that mechanism set for maximum hole depth and in its uncocked position after having fired.

Referring now to FIG. 2, the trigger mechanism has a base plate 120 secured to the top of the housing 55. Extending down from the base plate is a support block 121. One end of an elongate depth adjusting screw 122 rests in the support block in a manner permitting the screw to turn. The depth adjusting screw 122 extends through the side of the housing 55 where it is provided with a knob 123 to enable the screw to be turned by hand. Mounted on the screw as shown in FIGS. 2, 18, and 20 is a carrier 46 having internal threads engaged with the threads of adjusting screw 122 whereby rotation of the adjusting screw causes the carrier 46 to move along the screw. To prevent the carrier from rotating when the screw is turned, the top of the carrier is flat and the carrier slides along the flat surface of the base plate. Mounted on the carrier, as depicted in FIGS. 1, 18 and 20, is a trigger slide lever 45. The trigger slide lever has one end pivotally secured to the carrier and extends beneath and parallel to the adjusting screw 122. An intermediate portion of lever 45 rests, as best shown in FIG. 19, in a slot in support block 121. The block 121 carries a spring 47 which presses a cup 123 against the lever 45 to force the lever to move outward from the slot in the direction of the arrow in FIG. 18. The lever 45 has a longitudinal slot in which is disposed a pin 124 that extends down from trigger bar 48. That arrangement permits the trigger slide lever 45 to move longitudinally when the adjusting screw 122 is turned and thus determines the position of the free end of that lever.

FIG. 18 shows the trigger mechanism set for minimum depth whereas FIG. 20 shows the mechanism set for maximum depth.

The trigger bar 48 at one end has a hooked tip that engages the sear 49. At a position intermediate its ends, the trigger bar 48 is pivotally attached at 125 to the end of the short arm of an L-shaped lever 126. At its bend, the L-shaped lever rotates about a pivot 127 extending from the base plate 120. The long arm of the L-shaped lever 126 is pulled by spring 128 which is anchored on the base plate. Opposing the spring force is a stop rod 129 which extends through the side of the housing. Surrounding a portion of the stop rod 129 is a light spring 130 which keeps the inner end of the rod in contact with the long arm of the L-shaped lever 126. The trigger mechanism normally is automatically actuated but in an emergency the trigger mechanism can be manually fired to bring the drilling cycle to an end by pushing on the protruding end of rod 129 (FIG. 3). The rod 129, as shown in FIG. 3, carries a collar 135 that actuates a switch 139 when the rod is pushed or when the trigger mechanism is automatically actuated. The switch, upon being actuated, shuts off the electric motors as a safety measure.

As shown in FIG. 18, when the trigger mechanism is cocked, the hooked end of trigger bar 48 engages sear 49 and prevents rotation of the sear about its pivotal axis 131. The sear has a slotted end in which is disposed a pin 132 that extends from the hollow tube 43. As shown in FIG. 4 within the hollow tube is a helical spring 50 having one end bearing against a support 133 extending down from the base plate and having its other end urging the tube in the direction of the arrow X in FIG. 18. One end of the tube 43 is seated in the support 133 and that support has a slot through which the pin 132 (FIGS. 18 and 20) projects into the slotted end of sear 49. The other end of tube 43 is supported by a boss 134 that extends down from the base plate.

Mounted on the tube 43 to slide therealong as shown in FIG. 4 is the trigger slide 42 having a slot in which the flange 27 of the feed screw is received. Thus as the flange moves, it moves the trigger slide 42 along with it. As shown in FIGS. 1, 18, and 20, the trigger slide 42 has an arm 44 which bears against the trigger slide lever 45 and prevents the spring 47 from pushing that lever out of the slot in support 121. Consequently, the trigger slide 42 prevents pivoting of lever 45 so long as the arm of the trigger slide is in contact with that lever. However, as the hole in the work is drilled to greater depth, flange 27 moves the trigger slide 42 to a position where its arm is beyond the end of the trigger lever 45. At the instant the arm releases the end of the trigger lever, spring 47 forces that lever to pivot inwardly toward the tube 43. The inward pivoting of lever 45 causes trigger bar 48 to turn about its intermediate pivotal axis 125 and release the sear 49. Release of the sear enables spring 50 to propel the tube 43 to the left as viewed in FIG. 20. Propulsion of that tube causes the declutch arm 51 to pivot and cause declutch ring 53 to raise the peck feed pawls and the hitch feed pawls out of engagement with the ratchet wheel. As shown in FIGS. 6 and 7 the declutch ring 53 has a wedge shaped surface facing the pawls. The pawls each have a beveled edge that enables the declutch ring 53 to lift the pawls when the declutch ring is swung against the pawls upon firing of the trigger mechanism. Release of the ratchet wheel enables return spring 39 to turn the feed screw 13 in the direction to retract the drill from the work and spins the feed screw back to its starting position.

Release of sear 49 enables the sear to pivot and pull a reset lever 136 which is pivotally attached to the disengaged end of the sear. The reset ever 136 has a ramp that rides on a fixed stub 137 extending downwardly from the base plate. As the ramp of reset lever 136 rides up on the fixed stub, the reset lever is forced to pivot and is pressed against the short arm of L-shaped lever 126 forcing lever 126 to pivot. The end of the short arm thereupon swings counter clockwise as viewed in FIG. 20, causing the notched end of trigger bar 48 to be brought against a stop 138 on the base plate. When the notched end of trigger bar 48 hits stop 138, further movement of reset lever 136 forces the trigger bar to push the trigger slide lever 45 back into the slot in support 11. That position of trigger slide lever 45 clears the path for trigger slide 42 to return to an initial position where its arm can again engage the trigger slide lever 45 upon recocking of the trigger mechanism.

The trigger mechanism is recocked when one of the four cocking cams 95 (FIG. 3) on Geneva wheel 20 is brought against cocking lever 96. Cocking lever 96 is secured on a shaft with a second lever 140 which has its tip in engagement with a pin 141 extending from tube 43. Pin 141 is free to move in a slot in support 133. When the cocking cam engages lever 96, lever 140 is caused to push pin 141 and tube 43 to the right as viewed in FIG. 20 against the force of spring 50. Movement of tube 43 to the right causes sear 49 to pivot back to its original position and allows reset lever 136 to be restored to its original position. Resetting of lever 136 permits spring 128 to pull the L-shaped lever 126 back to its original position and causes the hooked end of the trigger bar 48 to reengage the sear. When tube 43 is restored to its original position, a spring 141 on that tube causes the declutch arm 51 to be swung back to its originl position. Inasmuch as there are four recocking cams on the Geneva wheel, recocking is assured at the start of each peck drill cycle.

I claim:

1. In a peck drilling machine of the type employing
   (a) a spindle having means for supporting a cutting tool,
   (b) a spindle housing in which the spindle is supported for rotation, and
   (c) means supporting the spindle housing whereby the spindle housing and the spindle can move axially as a unit toward and away from the work,
   the improvement of a trigger mechanism for automatically governing the extent of forward feed of the spindle comprising,
   (1) a propulsion tube extending in the direction of axial movement of the spindle, the propulsion tube having a projecting pin affixed thereto,
   (2) resilient means urging the propulsion tube in one direction along its longitudinal axis,
   (3) a slider mounted to slide along the propulsion tube,
   (4) means on the spindle housing causing the slider to move with axial movement of the spindle housing,
   (5) a sear pivoted intermediate its ends, the sear having a slot at one end receiving the pin projecting from the propulsion tube,
   (6) a lever pivotally mounted at one end, the lever having in it a longitudinally extending slot,
   (7) a trigger bar pivotally mounted intermediate its ends, the trigger bar having means at one end for engaging the sear and adjacent its other end carrying a pin extending into the slot in the lever,
   (8) a spring urging the lever to pivot about its pivotal axis,
   (9) the slider engaging the lever and preventing pivoting of the lever, the slider being adapted to move along the lever and release the lever upon passing the lever's end whereupon the lever is able to pivot and cause the trigger bar to release the sear, and
   (10) means actuated upon release of the sear for terminating forward feed of the spindle.

2. The improvement according to claim 1, further including
   (11) an adjustable support on which the lever is pivotally mounted at said one end, the adjustable support being movable whereby the position of the end of the lever can be changed relative to the slider,
   (12) an L-shaped crank pivoted at its bend, the trigger bar being pivotally mounted on one arm of the L-shaped crank,
   (13) a stop positioned to limit movement away from the sear of the disengaged end of the trigger bar,
   (14) a fixed member, and
   (15) a reset lever pivotally attached to the sear, the reset lever having an inclined face adapted to ride upon the fixed member whereby upon the trigger bar striking the stop, the reset lever causes the crank to pivot in the direction enabling the trigger bar to push the lever out of the path of the slider.

3. A trigger mechanism comprising
   (1) a propulsion tube having a pin projecting therefrom,
   (2) resilient means urging the propulsion tube in one direction along its longitudinal axis,
   (3) a slider mounted to slide along the propulsion tube,
   (4) means for causing the slider to move along the propulsion tube,
   (5) a sear pivoted intermediate its ends, the sear having a slot at one end receiving the pin projecting from the propulsion tube,
   (6) an adjustable support,
   (7) a lever pivotally mounted at one end on the adjustable support, the lever having in it a longitudinally extending slot,
   (8) a crank mounted to pivot about a fixed axis,
   (9) a trigger bar pivotally mounted intermediate its ends on one end of the crank, the trigger bar having means at one end for engaging the sear and adjacent its other end carrying a pin extending into the slot in the lever,
   (10) a spring arranged to urge the lever to pivot about its pivotal axis on the adjustable support,
   (11) the slider engaging the lever and preventing pivoting of the lever, the slider being adapted to move along the lever and release the lever upon passing the lever's end whereupon the lever pivots and causes the trigger bar to pivot and release the sear, and
   (12) means positioned to be actuated by the movement of the propulsion tube following release of the sear.

4. The trigger mechanism according to claim 3, further comprising
   (13) a stop positioned to limit movement of the trigger bar away from the sear, and
   (14) a reset lever pivotally attached to the sear, the reset lever having an inclined face adapted to ride upon a fixed member whereby upon the trigger bar striking the stop, the reset lever causes the crank to pivot in the direction enabling the trigger bar to push the lever out of the path of the slider.

* * * * *